US010933390B2

(12) United States Patent
Zolper et al.

(10) Patent No.: US 10,933,390 B2
(45) Date of Patent: Mar. 2, 2021

(54) MICROPARTICLE GENERATION SYSTEM

(71) Applicant: WiSys Technology Foundation, Inc., Madison, WI (US)

(72) Inventors: Thomas J. Zolper, Cuba City, WI (US); Jon J. Amberg, La Crosse, WI (US); Nathan L. Klaassen, Ottawa, IL (US); Carter J. Rowley, Rockford, IL (US); Karl Chic, Platteville, WI (US); Brad Borchardt, De Pere, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 38 days.

(21) Appl. No.: 16/219,206

(22) Filed: Dec. 13, 2018

(65) Prior Publication Data

US 2019/0176116 A1 Jun. 13, 2019

Related U.S. Application Data

(60) Provisional application No. 62/598,219, filed on Dec. 13, 2017.

(51) Int. Cl.
| | |
|---|---|
| *B01J 2/04* | (2006.01) |
| *B01J 2/16* | (2006.01) |
| *A23K 50/80* | (2016.01) |
| *B01J 4/00* | (2006.01) |
| *B01D 45/16* | (2006.01) |

(52) U.S. Cl.
CPC .............. *B01J 2/04* (2013.01); *A23K 50/80* (2016.05); *B01D 45/16* (2013.01); *B01J 2/16* (2013.01); *B01J 4/002* (2013.01)

(58) Field of Classification Search
None
See application file for complete search history.

(56) References Cited

U.S. PATENT DOCUMENTS

| | | | | |
|---|---|---|---|---|
| 3,720,737 | A * | 3/1973 | Klaphaak | B01J 2/04 264/8 |
| 4,238,429 | A * | 12/1980 | Sasaki | B01J 2/04 264/13 |
| 6,284,279 | B1 * | 9/2001 | Vanzin | B01J 2/04 424/464 |
| 2012/0098151 | A1 * | 4/2012 | Dai | C01D 9/18 264/12 |
| 2014/0000297 | A1 * | 1/2014 | Wieland | A23D 9/05 62/64 |
| 2019/0151771 | A1 * | 5/2019 | Thomas | B01D 11/0288 |
| 2019/0329200 | A1 * | 10/2019 | Dyballa | B01J 2/04 |

* cited by examiner

*Primary Examiner* — Mary Lynn F Theisen
(74) *Attorney, Agent, or Firm* — Boyle Fredrickson S.C.

(57) ABSTRACT

A system for fabricating microparticles useful for example in managing invasive species is provided. The system provides a nozzle for atomizing liquefied droplet material which is then suspended in a cyclonic separator receiving refrigerated gas until the droplets can solidify. In this way small droplets (less than 100 μm) can be readily fabricated in bulk without clumping and aggregating.

20 Claims, 4 Drawing Sheets

FIG. 5

MICROPARTICLE GENERATION SYSTEM

CROSS REFERENCE TO RELATED APPLICATION

This application claims the benefit of U.S. Provisional Application No. 62/598,219, filed Dec. 13, 2017 and hereby incorporated by reference.

STATEMENT REGARDING FEDERALLY SPONSORED RESEARCH OR DEVELOPMENT

This invention was made with government support under G16AC00043 awarded by the U.S. Geological Survey. The government has certain rights in the invention.

BACKGROUND OF THE INVENTION

The present invention relates to the production of microparticles from bulk solid material that is atomized and solidified for use.

Several species of carp native to Asia have been recently introduced into the waters of the United States in recent decades, in particular, big head, silver, black, and grass carp. While their introduction in southeast waters was intended to control weeds and parasites in these waters, the fish spread up the Mississippi River where they have been crowding native fish populations, compromising water quality and killing off sensitive species such as freshwater mussels. There is increasing concern that the Asian carp will migrate from the Mississippi River region into the Great Lakes region, and other basins such as the Upper Mississippi River and Ohio River basins, and threaten their ecosystems.

The federal government's Aquatic Nuisance Species Task Force encourages the active control of Asian carp by natural resources management agencies. Accordingly, chemical control has been one solution to deliver selective toxicants to the Asian carp while minimizing the effects of non-target aquatic species.

Currently, there are only four registered fish toxicants that can be used to control aquatic invasive organisms: the larval lampricides, TFM and niclosamide, and the general fish toxicants, rotenone and antimycin A. Niclosamide and TFM are approved as lampricides, but may not present a viable option as a control tool for bigheaded carps. Antimycin-A and rotenone are non-selective toxicants that are used for reclamation efforts when an entire body of water must be restored and restocked with fish.

SUMMARY OF THE INVENTION

The present inventors have recognized that there is an increasing need for selective delivery of toxicants to Asian carp without harming other wildlife in the ecosystem. In particular, the delivery of either rotenone or antimycin A is desired. The present inventors have found that rotenone is modified into a non-toxic chemical in the digestive system and therefore is ineffective as an oral toxicant. On the other hand, antimycin A maintains toxicity in the gut and is absorbed across the gut membrane making it an ideal candidate as a control chemical. Studies have demonstrated that antimycin A is more toxic than rotenone when orally delivered. Therefore, selective delivery of antimycin A to silver and bigheaded carps could be achieved by exploiting their natural filter-feeding behavior and delivering the pesticide orally via microparticle.

The present invention provides production of microparticles capable of delivering antimycin A to silver and bigheaded carps. Using spray atomization, the present inventors have formulated a microparticle that consists of, for example, talc, sorbitan, palmitate, and beeswax capable of delivering 4 mg antimycin A per 100 mg of particle. In controlled laboratory studies, the inventors found 100%, 20%, and 0% mortalities for bigheaded carps, Bluegill, and Largemouth Bass, respectively, in tanks where antimycin A-latent microparticles were applied. In duplicated controlled pond trials there was more than 50% mortality of the bigheaded carp, while no Largemouth Bass or Grass Carp mortality was found.

Specifically then, the invention provides a system for fabricating microparticles useful, for example, in managing invasive fish species. The system provides a nozzle for atomizing liquefied droplet material, which is then suspended in a cyclonic separator receiving refrigerated gas until the droplets can solidify. In this way small droplets (less than 100 μm) can be readily fabricated in bulk without clumping and aggregating.

In one embodiment, the present invention provides a microparticle generator assembly for forming solid microparticles from a solid bulk material comprising: a hopper providing a heating element configured to melt the solid bulk material contained in the hopper into a liquid; a spray nozzle communicating with the hopper to receive the liquid and having an orifice with a diameter configured to atomize the liquid into liquid droplets having an average size of less than 100 μm; and a cyclonic separator receiving and suspending the droplets in a refrigerated gas until solidification as solid droplets.

It is thus a feature of at least one embodiment of the present invention to produce micron diameter particles or microparticles of diverse materials while avoiding clogging of the spray atomizer.

The cyclonic separator may provide a chamber symmetric about a vertical axis and may provide an average suspension of the droplets for at least three revolutions about the axis.

It is thus a feature of at least one embodiment of the present invention to use inert atmospheric gases to both cool and drive cyclonic motion of the liquid droplets encouraging quick solidification.

The cyclonic separator may provide a chamber symmetric about a vertical axis and providing a tangential inlet near an upper surface for receiving the refrigerated gas and directing it along a tangent about the vertical axis into the chamber, a centrally located exhaust port at the upper surface, and a discharge port for discharging the solidified droplets at a lower surface.

It is thus a feature of at least one embodiment of the present invention to utilize centrifugal forces to increase the cooling time of microparticles within gases within a cyclone geometry.

The chamber may be generally conical with an apex pointed downward to connect with the discharge port.

It is thus a feature of at least one embodiment of the present invention to drive the collection of the solid microparticles naturally separated from other small particles, liquids and gases by its larger size and weight.

The nozzle may be displaced from the axis to direct droplets into the tangentially received refrigerated gas.

It is thus a feature of at least one embodiment of the present invention to utilize tangential velocity of the nitrogen gas to induce cyclonic motion of the liquid droplets.

The assembly may further include an air pump that may draw air from the exhaust port.

It is thus a feature of at least one embodiment of the present invention to utilize the natural separation of the heavier solid microparticles from the lighter particles, liquids and gases within the cyclone to collect the microparticles.

The assembly may further include a mixer for mixing the liquid material within the hopper.

It is thus a feature of at least one embodiment of the present invention to combine the solid bulk material with other materials prior to melting the solid bulk material and to make sure the mixture is efficiently heated and mix.

The assembly may further include a source of refrigerated gas having a temperature of less than −196° C. (−300° F.).

It is thus a feature of at least one embodiment of the present invention to provide additional cooling to the cyclone airstream in order to more quickly solidify the liquid material.

The assembly may further include a second heating element configured to heat the spray nozzle to above a melting point of the liquid mixture.

It is thus a feature of at least one embodiment of the present invention to provide additional heating of the spray nozzle in order to reduce the risk of clogs.

The assembly may further include a source of heated gas introduced into the spray nozzle having a temperature of more than 200° C. (392° F.).

It is thus a feature of at least one embodiment of the present invention to utilize heated gas to reduce the risk of clogs and to expel the liquid material through the nozzle.

The assembly may further include an insulated container receiving and storing the solid droplets received from the cyclonic separator.

It is thus a feature of at least one embodiment of the present invention to utilize the downward expulsion of the solid microparticles from the cyclone to quickly collect the microparticles for storage and use.

In one embodiment the present invention provides a method of forming solid microparticles from a solid bulk material comprising: melting the solid material mixture contained within a hopper into a liquid; atomizing the liquid into liquid droplets; and suspending the liquid droplets in a refrigerated gas until solidification as solid droplets.

It is thus a feature of at least one embodiment of the present invention to provide complete solidification of the liquid microparticles prior to collection.

The liquid droplets may be received within a chamber symmetric about a vertical axis and the liquid droplets are suspended for at least three revolution about the axis.

It is thus a feature of at least one embodiment of the present invention to facilitate the creation of spherical particle shapes through the rotational motion of the liquid droplets against the walls of the cyclone.

The liquid may be atomized by a stream of heated gas introduced into the spray nozzle having a temperature of more than 200° C. (392° F.). The heated gas may be nitrogen.

It is thus a feature of at least one embodiment of the present invention to prevent the clogging of the spray nozzle prior to expulsion.

The liquid droplets may have an average size of less than 100 μm.

The solid bulk material may comprise at least one of a talc, sorbitan, palmitate, and beeswax. The solid bulk material may further comprise a toxicant.

The refrigerated gas may be nitrogen gas. The refrigerated gas may be less than −196° C. (−300° F.).

These particular objects and advantages may apply to only some embodiments falling within the claims and thus do not define the scope of the invention.

DETAILED DESCRIPTION OF THE PREFERRED EMBODIMENT

Figure 1:
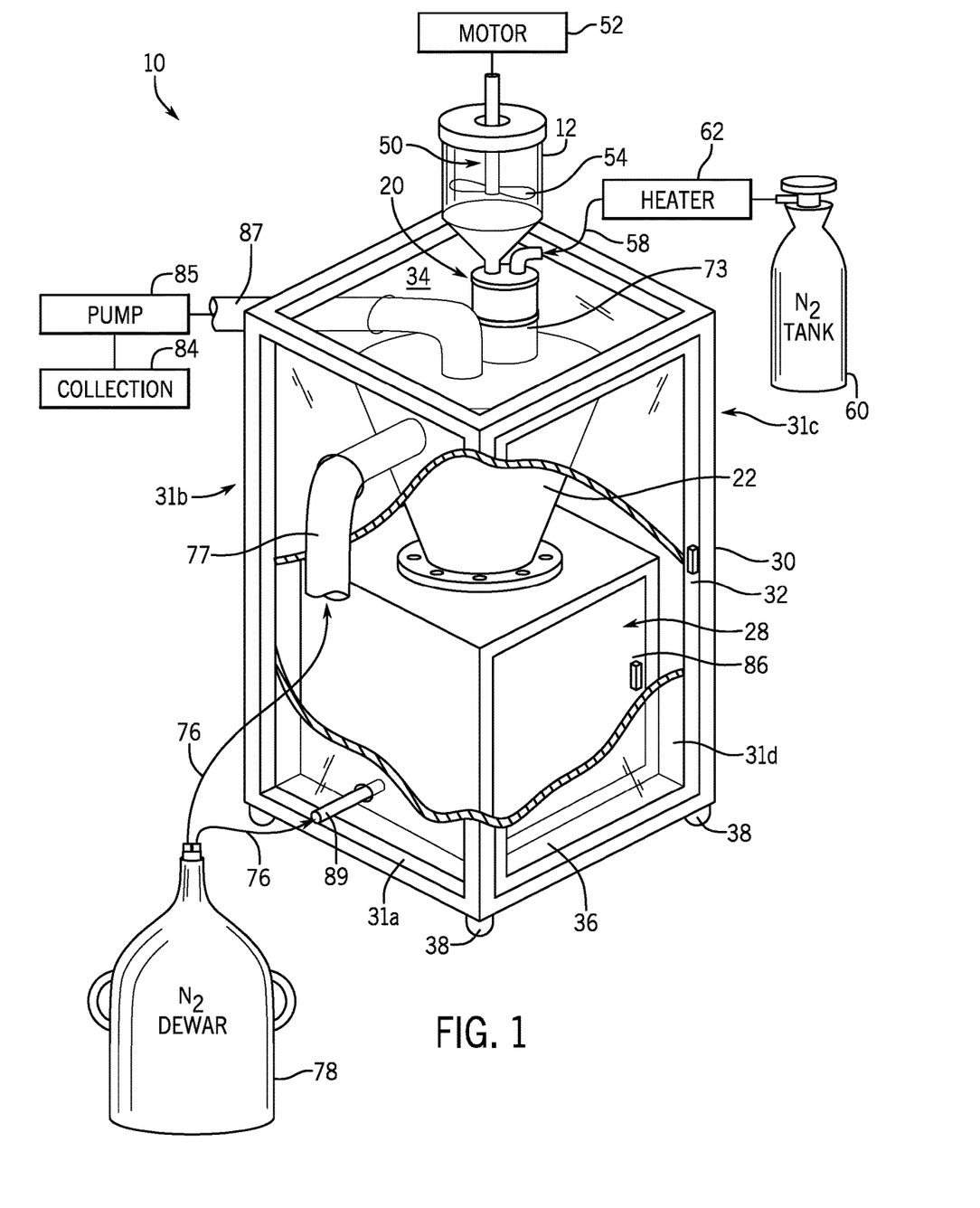
FIG. 1 is a perspective view of microparticle generation system for use with the present invention showing a hopper system delivering a spray atomized wax-toxicant mixture to a cyclone generator which is then stored in a cold storage.
Figure 2:
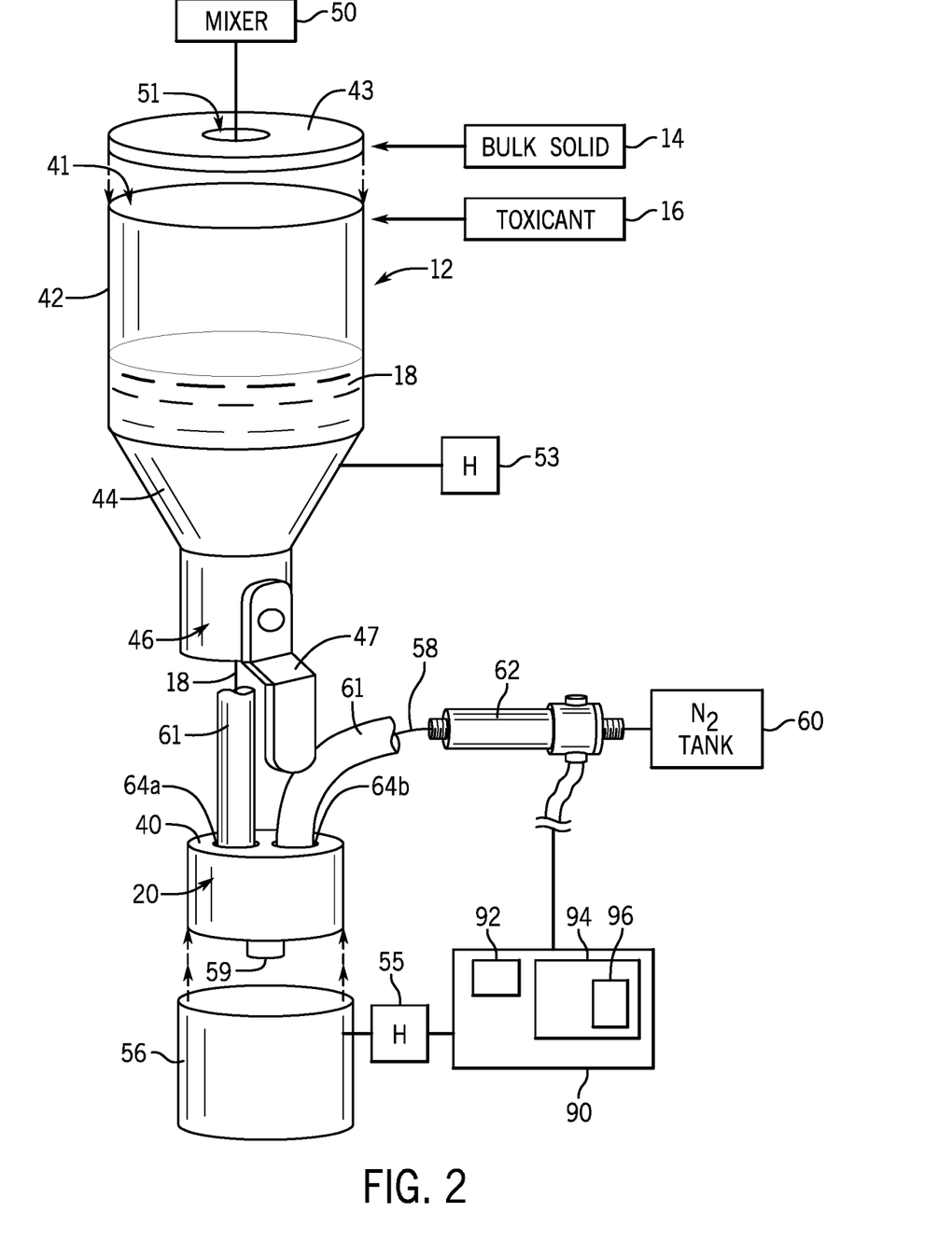
FIG. 2 is a exploded phantom perspective view of the hopper system of FIG. 1 receiving the bulk material and toxicant.
Figure 3:
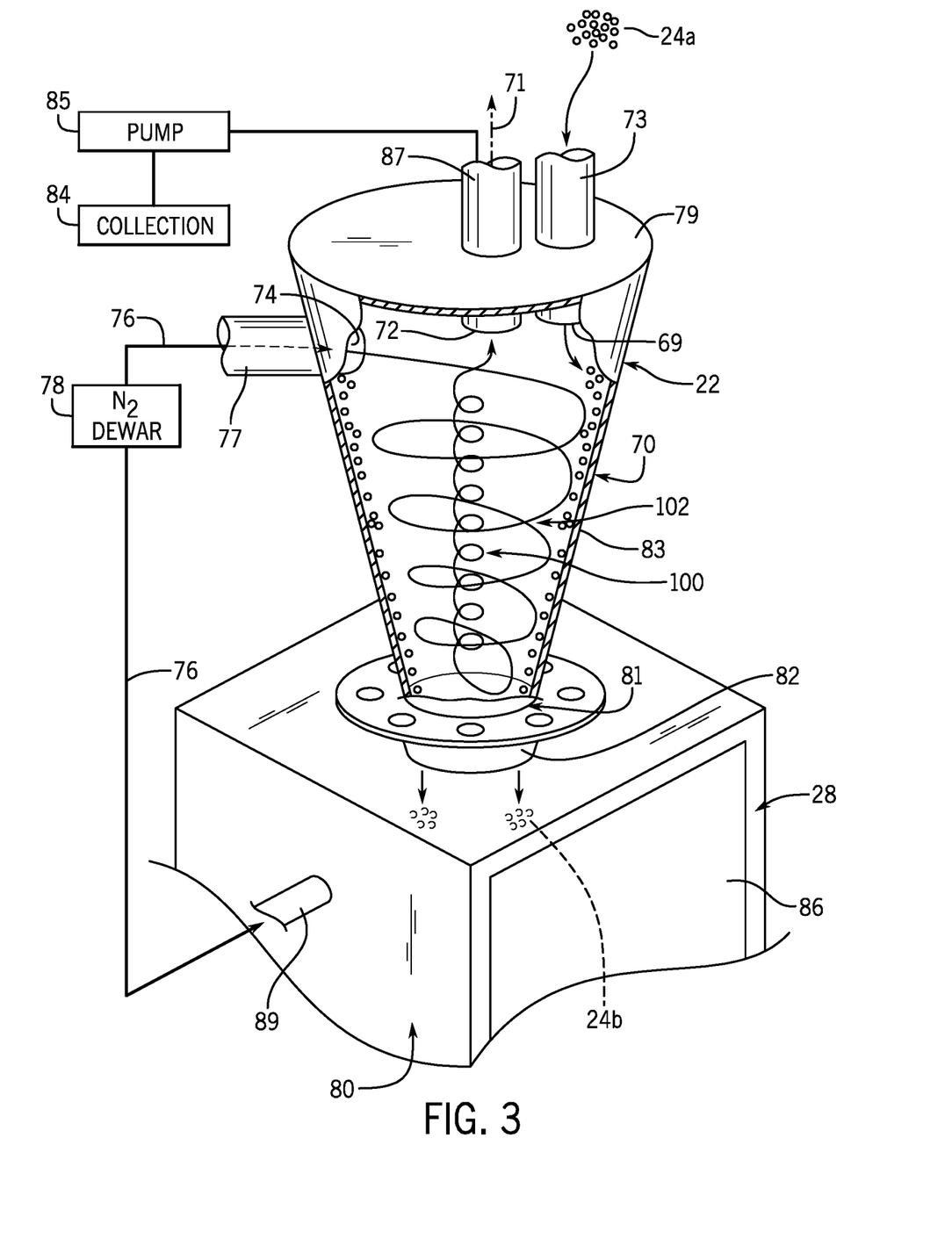
FIG. 3 is a phantom perspective view of the cyclone generator of FIG. 1 showing cyclonic action generated by tangential gas entering the cyclone and solidifying the wax toxicant mixture while smaller particles and gases exit the cyclone and solid microparticles drop into the cold storage.

Referring to FIGS. 1-3, a microparticle generator 10 may provide a generally vertically stacked arrangement providing an upper hopper 12, a spray nozzle 20, a cyclone generator 22, and a cooling chamber 28. The upper hopper 12 receives a solid bulk material 14 (for example, beeswax or beeswax mixture) and a toxicant 16 (for example, antimycin A) that is mixed and melted into a liquid form. The liquid wax toxicant mixture 18 is spray atomized by the spray nozzle 20 into the lower positioned cyclone generator 22. The liquid microparticles 24a are then cooled within the cyclone generator 22 to form solid microparticles 24b that are separated from smaller particles and air flow circulating within the cyclone generator 22. The separated solid microparticles 24b are then collected into the lower positioned cooling chamber 28 for storage and later use.

Referring now to FIG. 1, the lower positioned cyclone generator 22 and cooling chamber 28 may be enclosed within a cooling booth 30 being a generally rectangular enclosure having a cuboid frame supporting four transparent sidewalls 31a, 31b, 31c, 31d supporting a ceiling 34 at an upper edge and supported by a floor 36 at a lower edge. The sidewalls 31a, 31b, 31c, 31d may be glass or thermoplastic, such as an acrylic glass. At least one of the four transparent sidewalls 31d contains a door 32 providing access to the inner cavity of the cooling booth 30 containing the cyclone generator 22 and cooling chamber 28 stored therein. In this respect the cooling booth 30 may enclose and insulate the chilled elements of the microparticle generator 10 while the heated elements remain outside the cooling booth 30. The cooling booth 30 may be an insulated compartment or refrigerator with a heat pump as known in the art. The cooling booth 30 may be supported above the ground by wheels or casters 38 allowing for easy transport of the cooling booth 30. While the cooling booth 30 is described as having transparent walls so the user may easily see inside the cooling booth 30, it is understood that the walls may also be opaque or formed of a different insulating material.

Referring also to FIG. 2, the hopper 12 receiving the material to be mixed provides an upper portion defined by a generally cylindrical chamber 42. The cylindrical chamber 42 receives the solid bulk material 14 and toxicant 16 loaded by the user into the hopper 12. The desired amounts and proportions of each material 14, 16 to be mixed may be determined and premeasured by the user. In one embodiment, the bulk material 14 may comprise of a mixture of talc, sorbitan, palmitate, and beeswax in proportions capable of delivering 4 mg antimycin A per 100 mg of particle.

The top end of the cylindrical chamber 42 of the hopper 12 provides a circular opening 41 which may be removably enclosed by a circular cover or lid 43 once the bulk material 14 and toxicant 16 have been loaded into the hopper 12 to prevent spillage or splattering of the loaded materials during mixing and to prevent heat escape.

A mixer 50 may mechanically communicate with the cylindrical chamber 42 to mix the contents of the hopper 12. The mixer 50 may provide a motor 52 supported above the hopper 12 and operating agitator blades 54 extending downwardly into the cylindrical chamber 42 of the hopper 12 to mix the bulk material 14 and toxicant 16 to produce the wax toxicant mixture 18. The mixer 50 may partially extend through the lid 43, for example a drive shaft of the mixer 50 may extend through the lid 43, via an opening 51 in the lid 43. The motor 52 may be operated on and off by a switch to control rotation and speed of the agitator blades 54. As the agitator blades 54 rotate within the cylindrical chamber 42 of the hopper 12, the bulk material 14 is mixed with the toxicant 16 and heated (by mixing but also by a heater 53 described below) to form a toxic liquid substance.

The hopper 12 further provides a lower portion that narrows downwardly from the cylindrical chamber 42 to form a frustoconical shaped funnel 44 with a lower cylindrical nozzle 46 at a bottom end providing a controlled exit from the frustoconical shaped funnel 44. The exit of wax toxicant mixture 18 through the cylindrical nozzle 46 may be controlled by a valve, for example, a stainless steel ball valve opened and closed by a handle 47 operated by the user. The lower cylindrical nozzle 46 may be connected to heat resistant tubing 61 further connected to a nozzle mounting 40 of the spray nozzle 20, to be further described below.

The bulk material 14 and toxicant 16 is heated and melted within the hopper 12 to form a liquid substance by a heater 53 such as a heating pad or heating tape attached to the outer surface of the cylindrical chamber 42 to heat the hopper 12 and its contents. The heater 53 is preferably attached toward a lower end of the hopper 12 proximate the exit of the hopper 12. Alternatively, or in addition, the hopper 12 may also be heated by placing the entire hopper 12 within a heat chamber (not shown) having internal heating coils for heating the contents therein as known in the art. The heat chamber may be supported on and by the cooling booth 30.

The hopper 12 is open at a top end (when the lid 43 is removed) to allow the bulk material 14 and toxicant 16 to be loaded into the hopper 12 and open at a bottom end (through the cylindrical nozzle 46) to allow the wax toxicant mixture 18 to exit the bottom of the hopper 12 and into the nozzle mounting 40 of the spray nozzle 20. The lid 43 may include a closeable port window that can be opened or closed to easily deposit material and may also receive a funnel.

The nozzle mounting 40 may provide two ports 64a, 64b receiving the wax toxicant mixture 18 from the lower cylindrical nozzle 46 and pressurized nitrogen 58 from a pressurized nitrogen cylinder 60, respectively, through connection tubing 61. The connection tubing 61 may be able to withstand high temperature and high pressure of its contents. In one embodiment the wax toxicant mixture 18 is delivered through Viton or FKM (a synthetic rubber and fluoropolymer elastomer) and the pressurized nitrogen 58 is delivered through polytetrafluoroethylene (PTFE) (a synthetic fluoropolymer of tetrachloroethylene). It is understood that other types of high temperature resistant tubing known in the art may be used to deliver the wax toxicant mixture 18 and pressurized nitrogen 58 in a similar manner such as high temperature silicon tubing.

The wax toxicant mixture 18 is combined with an inert atmospheric gas such as the pressurized nitrogen 58 injected into the port 64b of the nozzle mounting 40. The pressurized nitrogen 58 may come from the pressurized nitrogen cylinder 60 and then heated by an in-line gas heater 62, for example, like those manufactured by Omega Engineering. The in-line gas heater 62 may be a tube of about ⅜ inch, ½ inch, or ¾ inch diameter, providing a heating length of about 5½ inches and providing 120 or 240 V to ceramic coils within the tube. The in-line gas heater 62 may provide hot nitrogen up to 1000° F. (540° C.) by controlling the voltage and/or the airflow through the in-line gas heater 62. The temperature and the pressure of the pressurized nitrogen may be controlled by the pressurized nitrogen cylinder 60 and the in-line gas heater 62. The heated pressurized nitrogen 58 may be at a temperature of more than 200° C.

The wax toxicant mixture 18, and in particular, the bulk material 14 of the mixture may be further heated by a sleeve 56 extending around and covering the nozzle mounting 40 and/or spray nozzle 20 and communicating with a heat source 55. The sleeve 56 may be an aluminum sleeve. In one embodiment, the sleeve 56 may be an insulated heating tape providing high gauge stranded resistance wires, for example, aluminum wires, which are insulated and knitted or woven into tape that may be easily wrapped around the lower cylindrical nozzle 46 to heat the nozzle. The aluminum wires communicate with an external temperature control device which controls the amount of electricity delivered to the wires.

It is understood that the pressurized nitrogen 58 and the heated nozzle sleeve 56 provide the advantages of two forms of heating of the wax toxicant mixture 18 within the nozzle 20 reducing the risk of clogs to the spray nozzle 20 prior to expulsion.

The pressurized nitrogen 58 may be combined with the wax toxicant mixture 18 to help expel the wax toxicant mixture 18 through the spray nozzle 20. The pressurized gas drives the wax toxicant mixture 18 from the inlets 64a, 64b to the outlet orifice 59 of the spray nozzle 20 to be spray atomized, or broken up into liquefied droplets. The combination of the wax toxicant mixture 18 and pressurized nitrogen 58 may occur inside the spray nozzle 20 or exterior to the spray nozzle 20 depending on the spray nozzle 20 type as known in the art.

In one embodiment, the spray nozzle 20 may be an internal mix nozzle providing a configuration whereby the wax toxicant mixture 18 and pressurized nitrogen 58 are combined within the spray nozzle 20. The shearing between high velocity pressurized nitrogen 58 and low velocity wax toxicant mixture 18 disintegrates the wax toxicant mixture 18 stream into droplets producing a high velocity spray. In an alternative embodiment, the spray nozzle 20 may be an external mix nozzle providing a configuration whereby the pressurized nitrogen 58 and wax toxicant mixture 18 mix and atomize outside the nozzle. The external mix configurations may require more pressurized nitrogen 58 and a higher pressure drop of pressurized nitrogen 58. It is understood that other types of spray nozzles and configurations may be used to produce spray atomized liquid microparticles 24*a* as known in the art.

The spray nozzle's outlet orifice 59 may be sized according to the desired size of the liquid microparticles 24*a*. In one embodiment the outlet orifice 59 may be between 30 to 60 micron or approximately 35 micron to produce liquid microparticles 24*a* having a diameter of 30 to 60 µm or approximately 35 µm. It is understood that the spray nozzle 20 may be interchanged to produce liquid microparticles 24*a* between 0.1 and 100 µm in diameter. The liquid microparticles 24*a* are liquid droplets that are generally spherical in shape.

The temperature and pressure of the wax toxicant mixture 18 may be regulated by standard feedback control of the pressurized nitrogen cylinder 60, heating element 55 heating the sleeve 56, and/or in-line gas heater 62 heating the nitrogen gas 58 under the control of a controller 90 and providing a processor 92 communicating with an internal memory 94 holding a stored program 96. The controller may provide feedback signals from a temperature sensor and/or pressure sensor of the type well known in the art for proper control of the elements described above for desired temperature and pressure control. The temperature sensors may be surface or probe thermocouples. For example, in one embodiment, the toxicant 16 breaks down at a temperature of about 145° C. while the bulk material 14 has a melting point at about 63° C. Therefore it would be preferred to keep the temperature of the wax toxicant mixture 18 below 145° C. but above 63° C. The flow rates of each of the pressurized nitrogen 58 and wax toxicant mixture 18 may also be controllably adjusted in order to control the droplet size.

Referring now to FIGS. 1 and 3, the liquid microparticles 24*a* exiting the spray nozzle 20 spray into the cyclone generator 22 positioned therebelow. The cyclone generator 22 may be defined by a frustoconical container 70 extending along a cyclone axis 71 between an upper plate 79 being a base of a cone of the frustoconical container 70 and lower parallel plate 81 tapering to an apex, the plates of the conical frustum separated by a frustoconical side wall 83 and having a number of inlets and outlets encouraging the creation of cyclonic wind action within the container as described below.

Figure 4:
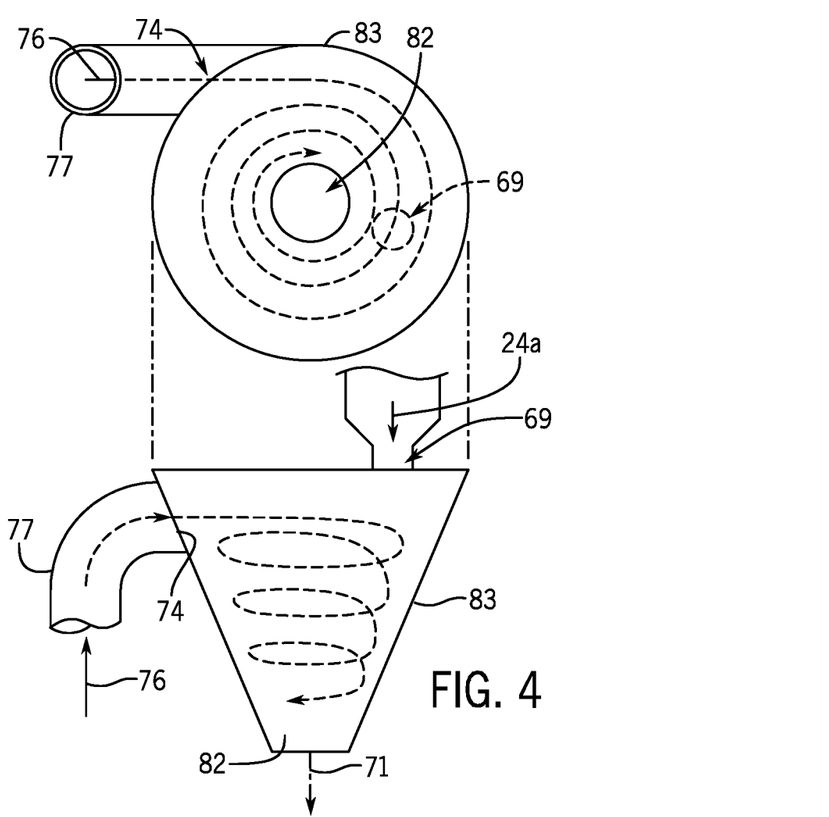
FIG. 4 is a schematic top and side view of the cyclone of FIG. 1 showing a tangential gas inlet and the liquid droplets dropped perpendicular to the cyclonic flow of the chilled gas.

Referring also to FIG. 4, the chilled liquid nitrogen 76 is introduced through a side inlet 74 of the frustoconical side wall 83. The side inlet 74 may be positioned tangential to the frustoconical side wall 83 so that the chilled liquid nitrogen 76 flows tangential to the frustoconical side wall 83 upon entering the frustoconical container 70 and follows a rotational, cyclical motion within the frustoconical container 70. The side inlet 74 is also positioned above a vertical center point of the frustoconical container 70 so that the chilled liquid nitrogen 76 follows a cyclonic path as it travels down the frustoconical side wall 83 from a top end of the frustoconical container 70 toward a bottom end.

The chilled liquid nitrogen 76 may be delivered into the cooling chamber 28 through tubing 77 extending through a sidewall 31*a* of the cooling chamber 28 and communicating with an external storage dewar 78 outside the cooling chamber 28 delivering the chilled liquid nitrogen 76. The storage dewar 78 may be a double-walled flask of metal or silvered glass with a vacuum between the walls as known in the art to keep the liquid nitrogen 76 cooled well below ambient temperature. The chilled liquid nitrogen 76 may be less than −196° C.

The upper plate 79 may further include an exhaust port 72 generally centered within the upper plate 79 extending along the cyclonic axis 71 and communicating with a tube 87 extending through a sidewall 31*b* of the cooling chamber 28 to the outside of the cooling chamber 28 and communicating with an in-line air pump 85, such as a fan, drawing air from the exhaust port 72 and providing a lower gas pressure within the tube 87 thus causing a movement of small particles and gasses from the frustoconical container 70 into the tube 87. Small particles and gasses circulating within an inner vortex 100 of the cyclonic airstream are "sucked" up by the air pump 85 generally along the cyclone axis 71 and out through the exhaust port 72. The tube 87 may empty into a collection container 84 receiving the small particles and gasses which may contain leftover toxic or waste material such as toxicant 16 for proper disposal.

The upper plate 79 of the frustoconical container 70 provides an inlet 69 displaced from the cyclone axis 71 receiving the liquid microparticles 24*a* expelled by the spray nozzle 20 through a tube 73 extending through the ceiling 34 of the cooling chamber 28. The liquid microparticles 24*a* are injected vertically downward into the cyclonic airstream created by the chilled liquid nitrogen 76 so that it flows substantially perpendicular to the cyclonic airstream. The liquid microparticles 24*a* are centrifuged against the frustoconical side wall 83 by centripetal forces generated by the cyclonic airstream to follow an outer vortex 102 of the cyclonic airstream. As the liquid microparticles 24*a* circulate within the frustoconical container 70, the liquid microparticles 24*a* are suspended within the chilled liquid nitrogen 76 and thereby cooled in temperature with every rotation. It is expected that the liquid microparticles 24*a* require about four revolutions within the frustoconical container 70 before the liquid microparticles 24*a* solidify.

The lower plate 81 of the cyclone generator 22 provides a discharge port 82 removing solid microparticles 24*b* from the frustoconical container 70 as they solidify by dropping through the discharge port 82 by the weight of the solid microparticles 24*b* against the cyclonic wind action and the sucking forces of the in-line air pump 85.

Figure 5:
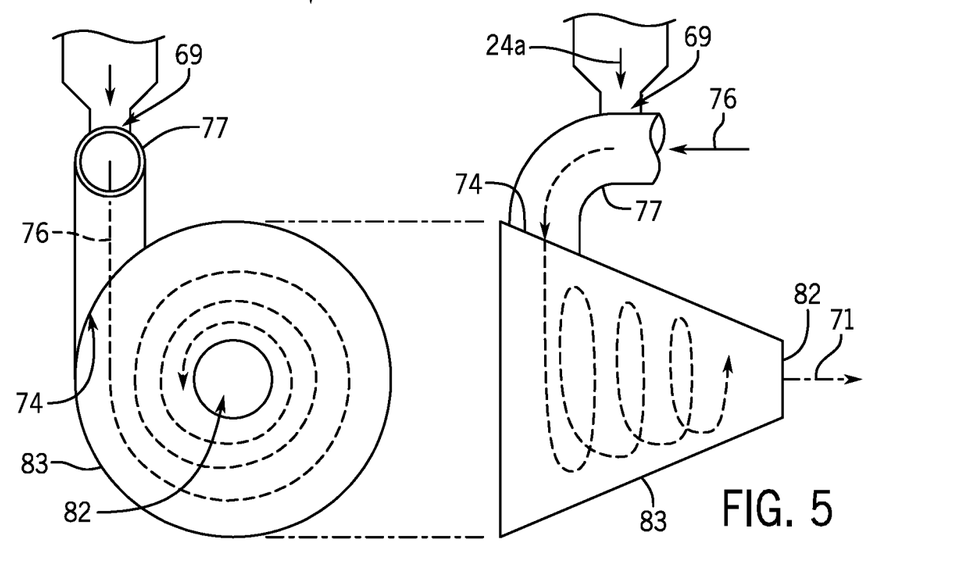
FIG. 5 is a schematic top and side view of a second embodiment of the present invention showing the hopper system rotated 90 degrees and showing a tangential gas inlet and the liquid droplets dropped along the cyclonic flow of the chilled gas.

In some embodiments, the cyclone axis 71 of the frustoconical container 70 may be oriented at other angles with respect to vertical to prevent thick wax buildup along the frustoconical side wall 83 of the frustoconical container 70. For example, the cyclone axis 71 may be oriented between 0 to 90 degrees with respect to vertical. In one embodiment, shown in FIG. 5, the cyclone axis 71 may be oriented 90 degrees (horizontal) with respect to vertical. In this respect, the chilled liquid nitrogen 76 is introduced through a side inlet 74 of the frustoconical side wall 83 that provides nitrogen flow that is vertical and parallel to the vertical flow of the liquid microparticles 24*a* expelled by the spray nozzle 20. In this respect, the liquid microparticles 24*a* are cooled longer as it drops before contacting the frustoconical side wall 83.

The frustoconical container 70 may generally be of the type sold by Oneida Air Systems under the trade name Dust Deputy.

Referring again to FIGS. 1 and 3, once the liquid microparticles 24*a* have solidified, the solid microparticles 24*b* are collected into the lower cooling chamber 28 thus being trapped within the lower cooling chamber 28. The lower cooling chamber 28 may be an insulated compartment or a refrigerator/freezer with a heat pump, and providing, for example, polyurethane insulation and an outer polyethylene shell. The lower cooling chamber 28 provides an internal cavity 80 accessible through a door 86 providing for the collection and storage of solid microparticles 24b from above. In one embodiment, the internal cavity 80 may carry a removable collection container therein for receiving the solid microparticles 24b.

The liquid nitrogen storage dewar 78 may further provide chilled liquid nitrogen 76 to the cooling chamber 28, for example, delivered through tubing 89 extending through a sidewall 31a of the cooling chamber 28 for cooling the cooling chamber 28 and thus keeping the solid microparticles 24b below a melting temperature of the solid microparticles 24b.

In some embodiments the lower cooling chamber 28 may be simply used as storage while a separate chamber may be used to chill the solid microparticles 24b. For example, the solid microparticles 24b may be transported from a storage container to a cooling container. The solid microparticles 24b may be transported from the storage container to the cooling container using an automated system such as a conveyor belt.

In some embodiments the solid microparticles 24b may be coated with an additional layer of solid bulk material 14 having a lower melting point than the solid microparticles 24b in an additional coating step.

The solid microparticles 24b are collected from the lower cooling chamber 28 and further delivered to the desired delivery site, for example, into the body of water inhabited by the Asian carp. The solid microparticles 24b are then ingested by the Asian carp causing them to die.

While the present invention is described with respect to producing solid microparticles 24b which are a toxicant to Asian carp it is understood that the present invention may also be used in other contexts such as producing microparticles for pharmaceuticals, cosmetics, flavorings, etc. The hopper temperature, cyclone temperature, nozzle temperature, gas pressures, cyclone flow rate, etc. may be modified according to the properties of the mixed materials such as melting point and oxidation temperature.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A microparticle generator assembly for forming solid microparticles from a solid bulk material comprising:
    a hopper providing a heating element configured to melt the solid bulk material contained in the hopper into a liquid;
    a spray nozzle communicating with the hopper to receive the liquid and having an orifice with a diameter configured to atomize the liquid into liquid droplets having an average size of less than 100 μm and expel the liquid droplets; and
    a cyclonic separator communicating with the spray nozzle to receive and suspend the liquid droplets in a refrigerated gas until solidification of the liquid droplets as solid particles
    wherein the spray nozzle expels the liquid droplets into a cyclonic flow of the refrigerated gas.

2. The assembly of claim 1 wherein the cyclonic separator provides a chamber symmetric about a vertical axis and provides an average suspension of the droplets for at least three revolution about the axis.

3. The assembly of claim 1 wherein the cyclonic separator provides a chamber symmetric about a vertical axis and providing a tangential inlet near an upper surface for receiving the refrigerated gas and directing it along a tangent about the vertical axis into the chamber, a centrally located exhaust port at the upper surface, and a discharge port for discharging the solid particles at a lower surface.

4. The assembly of claim 3 wherein the chamber is generally conical with an apex pointed downward to connect with the discharge port.

5. A microparticle generator assembly for forming solid microparticles from a solid bulk material comprising:
    a hopper providing heating element configured to melt the solid bulk material contained in the hopper into a liquid;
    a spray nozzle communicating with the hopper to receive the liquid and having an orifice with a diameter configured to atomize the liquid into liquid droplets having an average size of less than 100 μm; and
    a cyclonic separator receiving and suspending the droplets in a refrigerated gas until solidification as solid particles;
    wherein the cyclonic separator provides a chamber symmetric about a vertical axis and providing a tangential inlet near an upper surface for receiving the refrigerated gas and directing it along a tangent about the vertical axis into the chamber, a centrally located exhaust port at the upper surface, and a discharge port for discharging the solid particles at a lower surface; and wherein the spray nozzle is displaced from the axis to direct droplets into the tangentially received refrigerated gas.

6. The assembly of claim 3 further including an air pump drawing air from the exhaust port.

7. The assembly of claim 1 wherein the hopper further includes a mixer for mixing the liquid material within the hopper.

8. The assembly of claim 1 further including a source of refrigerated gas having a temperature of less than −196° C. (−300° F.).

9. The assembly of claim 1 further including a second heating element configured to heat the spray nozzle to above a melting point of the liquid mixture.

10. The assembly of claim 1 further including a source of heated gas introduced into the spray nozzle having a temperature of more than 200° C. (392° F.).

11. A microparticle generator assembly for forming solid microparticles from a solid bulk material comprising:

a hopper providing heating element configured to melt the solid bulk material contained in the hopper into a liquid;

a spray nozzle communicating with the hopper to receive the liquid and having an orifice with a diameter configured to atomize the liquid into liquid droplets having an average size of less than 100 µm; and a cyclonic separator receiving and suspending the droplets in a refrigerated gas until solidification as solid particles further including an insulated container receiving and storing the solid particles received from the cyclonic separator.

12. A method of producing a fish toxicant in the form of solid microparticles from a solid bulk material comprising:

melting the solid material mixture contained within a hopper into a liquid;

atomizing the liquid through a spray nozzle into liquid droplets;

suspending the liquid droplets in a refrigerated gas until solidification as solid particles; and distributing the solid particles to fish.

13. The method of claim 12 wherein the liquid droplets are received within a chamber symmetric about a vertical axis and the liquid droplets are suspended for at least three revolution about the axis.

14. The method of claim 12 wherein the liquid is atomized by a stream of heated gas introduced into the spray nozzle having a temperature of more than 200° C. (392° F.).

15. The method of claim 14 wherein the heated gas is nitrogen.

16. The method of claim 12 wherein the liquid droplets have an average size of less than 100 µm.

17. The method of claim 12 wherein the solid bulk material comprises at least one of a talc, sorbitan, palmitate, and beeswax.

18. The method of claim 17 wherein the solid bulk material further comprises a toxicant.

19. The method of claim 12 wherein the refrigerated gas is nitrogen gas.

20. The method of claim 19 wherein the refrigerated gas is less than −196° C. (−300° F.).

* * * * *